Dec. 9, 1930.  J. M. GWINN, JR., ET AL  1,784,521
PULLEY MOUNT
Filed Oct. 22, 1928
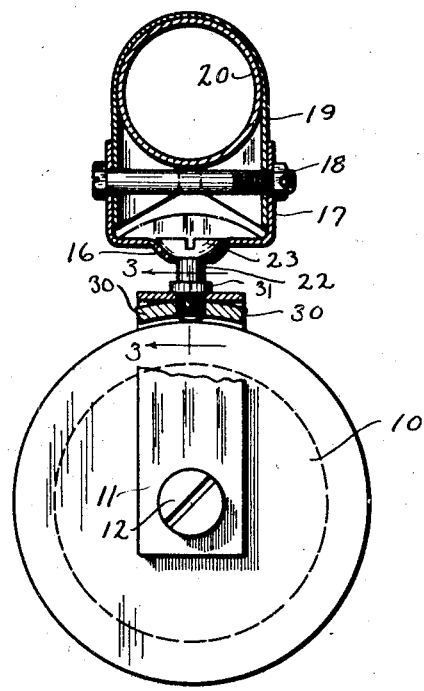
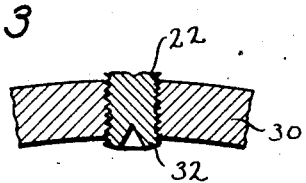
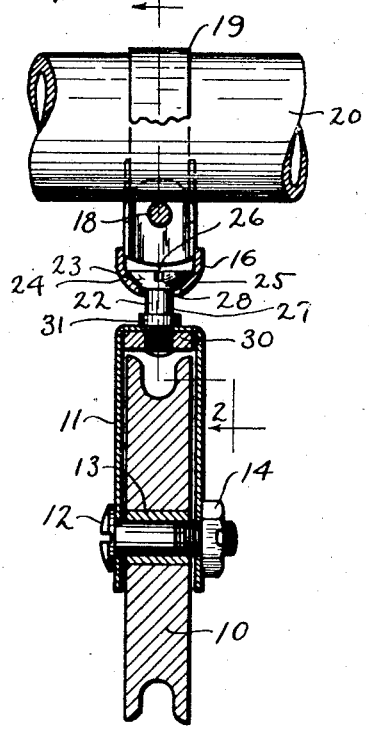
INVENTOR
Joseph M. Gwinn Jr
Ralph E. Oversmith
BY Marechal and Noe
ATTORNEYS Patented Dec. 9, 1930

1,784,521

UNITED STATES PATENT OFFICE

JOSEPH M. GWINN, JR., OF BUFFALO, AND RALPH E. OVERSMITH, OF KENMORE, NEW YORK, ASSIGNORS TO CONSOLIDATED AIRCRAFT CORPORATION, OF BUFFALO, NEW YORK, A CORPORATION OF DELAWARE

PULLEY MOUNT

Application filed October 22, 1928. Serial No. 314,140.

This invention relates to supporting means for pulley wheels and the like, and more particularly to supporting means providing for swiveling movements of the pulley wheel.

One object of the invention is the provision of a pulley mount having a pulley holding portion and a supporting portion universally connected, the construction being simple, cheap and easily manufactured and assembled.

Another object of the invention is the provision of a pulley mount having portions formed as simple sheet metal stampings connected together by a stud which is socketed in one of the portions and fixed to the other portion to provide for swiveling movements of the pulley wheel in all directions.

Other objects and advantages of the invention will be apparent from the following description and from the accompanying drawing, in which—

Fig. 1 is a pulley mount embodying the present invention, shown in section;

Fig. 2 is a section on the line 2—2 of Fig. 1; and

Fig. 3 is a detail section on the line 3—3 of Fig. 2.

In the mounting of pulley wheels and the like, as for example the pulley wheel over which control cables are guided, it is desirable that the pulley wheel have some freedom of movement so that the cable which is guided and changed in direction by the pulley wheel extends as nearly as possible in a direction transverse to a plane containing the axis of rotation of the pulley wheel and the point of tangency of the cable on the wheel. In accordance with the present invention which is particularly adapted among other uses, to the control and guiding of steering control cables of airplanes, the pulley wheel is supported for free swiveling movement about an axis extending transversely to the rotary axis of the pulley wheel and is also so mounted that limited bodily movement of the pulley wheel is permitted in any direction. The pulley wheel will thus so locate itself that the cable extends to and from the pulley wheel in directions transverse of the pulley wheel axis of rotation.

In the drawings, in which similar reference numerals designate like parts in the various views, the pulley wheel 10 is rotatably held by a strap portion 11 of the pulley mount. This strap portion is preferably of substantially U shape, and is constructed preferably in the form of a sheet metal stamping. The two legs of the U are provided with openings which receive the shaft 12, shown in the form of an ordinary bolt, this bolt extending through the center of the pulley wheel which is preferably provided with a bearing bushing 13. The bolt is retained in position by the nut 14, so that the pulley wheel is rotatably mounted on the strap portion 11, which is of such size as to provide for the passage of a cable between the bight portion of the strap and the groove or rim of the pulley wheel. The strap portion 11 is supported or hung from a supporting portion 16, which is also formed preferably as a sheet metal stamping of substantially U shape, the upwardly extending legs 17 of this portion providing mounting means adapted to be connected in the desired position. As shown the legs 17 of the supporting portion 16 are fastened by a bolt 18 to a suitable clip 19 which extends around a frame 20, which may be one of the longérons or tubular frame members of an airplane fuselage.

The connection between the strap portion 11 and the supporting portion 16 is one which provides for swiveling movements of the strap portion relatively to its support. Preferably this connection takes the form of a stud 22 having a shank fixed to one of the portions and socketed at its head end in the other portion. As shown the head 23 which is spherically curved to provide a seat surface 24, is socketed in a seat depression or socket 25 in the bight part of the supporting portion 16. The head may be slotted at 26 so that a screw driver can be conveniently used in assembling the parts. The shank portion 27 of the stud extends through an aperture 28 in the socket 25, this aperture being somewhat larger than the diameter of the stud so that some freedom of movement is permitted between the stud and the socket permitting tilting movements of the supporting strap 11 in any direction relative to the supporting portion 16. As rotational movements of the stud about its own axis are freely permitted by reason of the socketed connection between the head end of this stud and the supporting member 16, it will be apparent that universal motion of the supporting strap 11 and consequently of the pulley wheel itself is permitted. The end of the stud 22 extends through a hole in the bight portion of the supporting strap 11 and through a hole in a retaining plate 30. This hole in the retaining plate is preferably threaded and the end of the stud 22 is also preferably threaded so that it may be screwed into the retaining plate 30 to fix the stud securely in position on the supporting strap 11. The stud 22 is also preferably provided with a collar enlargement 31 which may be formed as an integral part of the stud, and which cooperates with the retaining plate 30 in securely fastening the stud 22 in position on the strap portion 11. After the threaded end of the stud 22 has been inserted through the retaining plate 30, the end of the stud may be punched to expand the stud end at 32, see Fig. 3, so that the various parts of the pulley swivel or mount will not become separated and lost.

The retaining plate 30, as shown in Fig. 2, is preferably of a length commensurate with the width of the strap portion 11, and this retaining plate as shown in this figure is curved or arcuate in form, the curvature of the plate being such that the center corresponds with the axis of rotation of the pulley wheel. The plate 30 therefore serves as a guide and retaining member for the cable which extends over the pulley wheel. It will now be apparent that the pulley wheel 10 is supported so that it may properly position itself due to the pull on the cable portions extending to and from the wheel, the pulley wheel having limited movement in all directions relatively to the supporting portion as well as free rotational movement about an axis extending transversely of the axis of rotation of the pulley wheel. The parts of the pulley mount are all of simple construction and are cheaply made and easily assembled, the pulley mount thus provided being adapted for many uses so that it may be manufactured in large quantities and utilized in various manners and for various purposes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A pulley mount comprising a sheet metal portion of substantially U-shape adapted to hold a pulley wheel, a sheet metal supporting portion of substantially U-shape, and a member fixedly attached to the bight part of one of said portions and socketed universally in the bight part of the other portion to universally connect said portions.

2. A pulley mount comprising a strap portion adapted to hold a pulley wheel and a supporting portion, both of said portions being substantially U-shaped and formed as sheet metal stampings, and means fixedly attached to said strap portion and universally socketed in the bight part of the U-shaped supporting portion to provide for rotational movement and limited tilting movement of said strap portion in any direction relatively to said supporting portion.

3. A pulley mount comprising a U-shaped sheet metal strap portion adapted to hold a pulley wheel, a substantially U-shaped supporting portion having a spherically-curved depression, a connecting stud having a spherically-curved head socketed for universal movement in said depression and having a shank extending through said strap and supporting portions, and a retaining plate within said strap portion in which the shank of the stud is threaded, said shank having an enlargement engaging one side of said strap portion so that the stud is fixedly secured to the strap portion.

4. A pulley mount comprising a strap portion adapted to hold a pulley wheel, a supporting portion having an apertured socket, a stud having a head seated in said socket and having a shank extending through the aperture in said socket and through said strap portion, a retaining plate through which said stud extends, the end of the stud being expanded to securely fasten it in position on the strap portion.

5. A pulley mount comprising a strap portion adapted to hold a pulley wheel, a supporting portion having an apertured socket, a stud having a head seated in said socket and having a shank extending through the aperture in said socket and through said strap portion, a retaining plate through which said stud extends, the end of the stud being expanded to securely fasten it in position on the strap portion, said retaining plate being curved substantially concentrically with the pulley wheel.

In testimony whereof we hereto affix our signatures.

JOSEPH M. GWINN, Jr.
RALPH E. OVERSMITH.